S. PERRY.
Equalizing the Temperature of Milk.
No. 43,863. Patented Aug. 16, 1864.
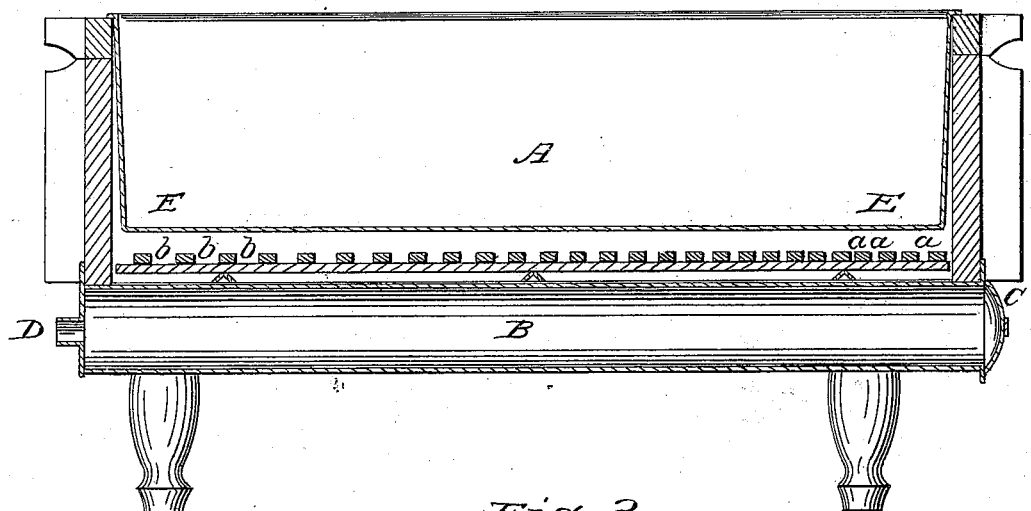
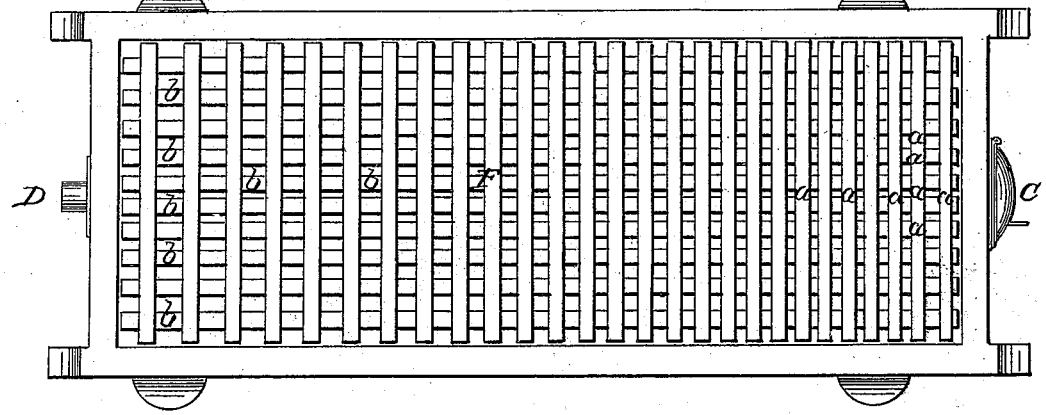

UNITED STATES PATENT OFFICE.

STUART PERRY, OF NEWPORT, NEW YORK.

EQUALIZING THE TEMPERATURE OF MILK.

Specification forming part of Letters Patent No. 43,863, dated August 16, 1864.

*To all whom it may concern:*

Be it known that I, STUART PERRY, of Newport, in the county of Herkimer and State of New York, have invented certain new and useful Improvements in the Manner of Equalizing the Temperature in and Throughout Milk-Vats for Cheese-Making; and I do hereby declare the following to be a full, clear, and exact description of the same, reference being had to the accompanying drawings, making a part of this specification, in which—

Figure 1 represents a vertical longitudinal section through a milk-vat and the furnace for heating it. Fig. 2 represents what may be termed the "equalizer," it being an open rack or perforated plate with graduated openings in or through it, and placed within the vat beneath the milk vessel or receiver.

Similar letters of reference, where they occur in the separate figures, denote like parts in both of them.

In milk-vats as at present heated there is much inequality in the temperature of the milk, differing in accordance to its nearness or remoteness from the heater. This difference of temperature, in the same mass, is as much as from 10° to 20°.

During certain portions of the process of heating or cheese-making the milk in the vat cannot be stirred or agitated to equalize the temperature throughout it, and no efficient means has hitherto been essayed to prevent this want of uniformity of temperature.

The nature of my invention consists in separating the water that is in contact with the milk-vat from the water that is in contact with the heater by a thin partition horizontally placed between the two, the said partition having small openings near together, but graduated in size in relation to their position as being nearer to or more remote from the point of greatest heat.

To enable others skilled in the art to make and use my invention, I will proceed to describe the same with reference to the drawings.

A represents a milk-vat made in any of the usual forms or ways, and having a heater, B, underneath it, of which C may represent the door for furnishing fuel, and D the exit-flue. The space E between the vat and the outer case in which it is placed is filled with water, which is heated by the fire underneath, and which imparts its heat to the milk in the vat.

The density of the fire being at one end of the vat, and there being no circulation of the water through the water-space, it is found that there is a difference of temperature in different portions of the vat which varies from 10° to 20°, and this variation extends to the milk itself, which cannot at certain periods of the process of cheese-making be agitated to equalize the temperature. Now, to preserve an equalization of the temperature throughout the vat, I introduce a partition, F, between the water that is in contact with the heater B and that which is in contact with the vat A of a peculiar kind and horizontally placed between the two, said partition having small openings through it near together, but graduated in size or area in relation to their position as being nearer to or more remote from the fire or greatest heat, as shown at $a$, nearest to the fire, and at $b$ most remote therefrom. These openings are quite small at $a$, directly over the fire, and increase in size in both directions—viz., longitudinally and laterally—the result being that the water in contact with the cheese-vat, being at a uniform temperature at the commencement of the heating operation, is gradually raised in temperature, and still kept uniform by the ascent of the heated water through openings in the partition, which are so graduated as that the lesser quantity of more highly-heated water going through the smaller openings shall give out about the same amount of heat to the water immediately above these openings, as the larger quantity of less highly-heated water going through the larger openings does to the water immediately above said larger openings. I prefer to make this partition F of wood, and in a latticed form, and with the graduated openings, as shown, rather than to bore a board full of different-sized holes, or to punch a metal diaphragm full of graduated holes, but either of these forms and material may be used, because they contain the leading feature of the invention—viz., the graduated openings through the partition.

I am aware that an ordinary rack has been used to set the milk-vat upon, but this does not in any manner equalize the heat by increasing the quantity of contact heated water where the temperature is diminished, and vice versa.

I have shown the heater as placed longitudinally with the vat. It may be placed transversely to the vat, and at or near the center thereof, but whichever way it is placed the openings through the partition should be smallest the nearer the heater, and increase in size as they recede from the heater, or become more remote.

The partition may be fast or loose, as may be preferred.

Having thus fully described my invention, what I claim therein as new, and desire to secure by Letters Patent, is—

The employment of a partition having graduated openings through it, and placed between the vat containing the milk and the heater that heats the water by which the milk is heated, the smaller openings being more directly over the fire or source of heat, and the larger openings more distant therefrom, substantially as and for the purpose set forth and explained.

STUART PERRY.

Witnesses:
WILLM. CHAPMAN,
GEO. L. BRADFORD.